United States Patent [19]
Akira et al.

[11] Patent Number: 5,816,350
[45] Date of Patent: Oct. 6, 1998

[54] CONDENSER CONFIGURATION FOR CONSTRUCTION MACHINES

[75] Inventors: Tatsumi Akira, Ibaraki-ken, Japan; Gianni Duri, Bologna; Dario Prealta, Turin, both of Italy

[73] Assignee: Fiat-Hatachi Excavators S.p.A., San Mauro, Italy

[21] Appl. No.: 625,589

[22] Filed: Mar. 28, 1996

[30] Foreign Application Priority Data

Mar. 31, 1995 [JP] Japan .................................. 7-076062

[51] Int. Cl.⁶ .................................................. B60K 11/04
[52] U.S. Cl. ........................................ 180/68.1; 180/68.4
[58] Field of Search .............................. 180/68.1, 68.2, 180/68.4, 68.6; 123/41.31, 41.51

[56] References Cited

U.S. PATENT DOCUMENTS

| | | | |
|---|---|---|---|
| 3,933,136 | 1/1976 | Burst ....................................... | 180/68.1 |
| 4,723,594 | 2/1988 | Koehr et al. ............................ | 180/68.4 |
| 4,938,303 | 7/1990 | Schaal et al. ........................... | 180/68.1 |
| 4,995,447 | 2/1991 | Weidmann et al. .................... | 180/68.4 |
| 5,046,550 | 9/1991 | Boll et al. .............................. | 123/41.31 |
| 5,234,051 | 8/1993 | Weizenbuger et al. ............... | 123/41.31 |

FOREIGN PATENT DOCUMENTS

| | | | |
|---|---|---|---|
| 2722089 | 11/1978 | Germany ............................... | 180/68.1 |
| 1-182123 | 7/1989 | Japan ..................................... | 180/68.4 |
| 4-163230 | 6/1992 | Japan ..................................... | 180/68.4 |
| 5-96960 | 5/1993 | Japan ..................................... | 180/68.1 |

*Primary Examiner*—Brian L. Johnson
*Assistant Examiner*—Frank Vanaman
*Attorney, Agent, or Firm*—Larry W. Miller; J. William Stader; Frank A. Seemar

[57] ABSTRACT

In a cooling structure for a construction machine, to appropriately install a condenser of an air conditioning system in a machine room to thereby ensure a superior cooling ability for a radiator and a oil cooler, while cooling the condenser, open air sucked by a fan through the intake ports cools a condenser, an oil cooler and a radiator successively, following which it is discharged to the outside through exhaust ports. The oil cooler is erected parallel to the radiator, while the condenser is inclined so as to extend from a portion near a lower end of the uppermost intake port formed in a side wall of an engine cover to a position near a lower end of the side-facing surface of the oil cooler.

2 Claims, 6 Drawing Sheets

CONDENSER CONFIGURATION FOR CONSTRUCTION MACHINES

BACKGROUND OF THE INVENTION

The present invention relates to a cooling structure for construction machines such as hydraulic excavators, and more particularly to a cooling structure for construction machines wherein open air is sucked by a fan rotated by an engine to cool a condenser, an oil cooler and a radiator, and cooling air after being used for cooling is discharged through an engine cover at the top of a machine room.

In construction machines such as hydraulic excavators, an engine, a fan attached to the engine, an oil cooler, a radiator and so on are generally installed in a machine room. Among these components, the radiator and the oil cooler are usually arranged vertically parallel to each other. Open air sucked by the fan for cooling the engine cools the oil cooler and the radiator sequentially in this order, and is then introduced to the rear side of the engine through a passage between an upper surface of the engine and an engine cover for cooling the machine room, especially, an engine room as primary part of the machine room. Hot air after being used for cooling is discharged to the outside through exhaust ports formed in an upper wall of the engine cover and a door of a pump room as part of the machine room.

Furthermore, when an air conditioner is mounted in a construction machine, a condenser for the air conditioner is also mounted in the machine room such that the three components, i.e., the radiator, the oil cooler and the condenser, are arranged vertically parallel to each other. In this case, the open air sucked by the fan for cooling the engine cools the condenser, the oil cooler and the radiator sequentially in this order.

SUMMARY OF THE INVENTION

In the cooling structure for construction machines, as stated above, the oil cooler, the radiator, etc. are cooled by the open air sucked by the fan. However, the flow resistance imposed on the sucked air in the machine room is large and there is a limit in a suction ability of the fan. Therefore, the conventional cooling structure has had the problem that it is difficult to achieve a sufficient cooling ability. In particular, construction machines mounting air conditioners thereon have had the problem that because the three components, i.e., the radiator, the oil cooler and the condenser, are arranged vertically parallel to each other in the machine room, the flow resistance is increased and the cooling ability becomes insufficient.

An object of the present invention is to provide a cooling structure for a construction machine wherein a condenser of an air conditioning system is appropriately installed in a machine room to thereby ensure a superior cooling ability for a radiator and a oil cooler, while cooling the condenser. To achieve the above object, the present invention is arranged as follows. Specifically, in a cooling structure for a construction machine wherein an engine, an oil cooler, a radiator and a condenser of an air conditioning system are installed in a machine room, a first intake port is formed in the upper side part of the machine room, a second intake port is formed in the side part of the machine room at a position lower than the first intake port, open air is sucked by a fan rotated by the engine through the first and second intake ports to cool the condenser, the oil cooler and the radiator, and cooling air after being used for the cooling is discharged through an engine cover at the top of the machine room, the condenser is inclined so as to extend from a portion near a lower end of the first intake port formed in the side part of the machine room to a position near a lower end of the oil cooler.

Preferably, the above cooling structure includes exhaust ports formed in a portion of the engine cover above a front portion of the engine, a first guide positioned radially outside the fan for guiding the cooling air just after having passed the fan, as a laminar flow, to the exhaust ports, and a second guide positioned above the front portion of the engine for guiding the cooling air discharged through the exhaust ports as a laminar flow, the second guide having a distal end positioned lower than the first guide, the exhaust ports being each positioned between the distal end of the second guide and a distal end of the first guide across the cooling air as a laminar flow.

In the present invention arranged as set forth above, the condenser serves as a guide plate for the open air sucked through the first intake port, allowing the open air sucked through the first intake port to flow downward along the condenser. On the other hand, the open air sucked through the second intake port flows in part directly into the oil cooler and the radiator, while the other part flows into the condenser. A stream of the air flowing into the condenser is straightened by the baffling action of tubes of the condenser, and then merges with the open air sucked through the first intake port. Thus, the open air sucked through the first intake port flows downward smoothly along the condenser and then flows into the oil cooler and the radiator while cooling the condenser, without directly interfering with the open air sucked through the second intake port. Also, part of the open air sucked through the second intake port passes through the condenser while cooling it, and then merges with the open air sucked through the first intake port before entering the oil cooler and the radiator. It is therefore possible to not only cool the condenser, but also smooth the air stream supplied to the oil cooler and the radiator. As a result, the flow resistance on the entry side of the fan is reduced, the intake efficiency is increased, and the cooling ability for the radiator and the oil cooler is enhanced.

With the exhaust ports and the first and second guides provided on the delivery side of the fan, most of the cooling air having passed the fan is discharged as a laminar flow through the exhaust ports near the fan. Because the distance from the fan to the exhaust ports is short and the cooling air is discharged as a laminar flow, the flow resistance is very small. Therefore, even if the area of the exhaust ports is set to be small, the exhaust efficiency is kept high. Consequently, the flow resistance is reduced on both the entry and delivery sides of the fan, both the intake efficiency and the exhaust efficiency are increased, and the cooling efficiency for the radiator and the oil cooler can be further improved.

BRIEF DESCRIPTION OF THE DRAWINGS

A condenser configuration for a construction machine in accordance with the present invention will now be described, by way of example, with reference to the accompanying drawings, wherein.

DETAILED DESCRIPTION OF THE PREFERRED EMBODIMENT

Figure 1:
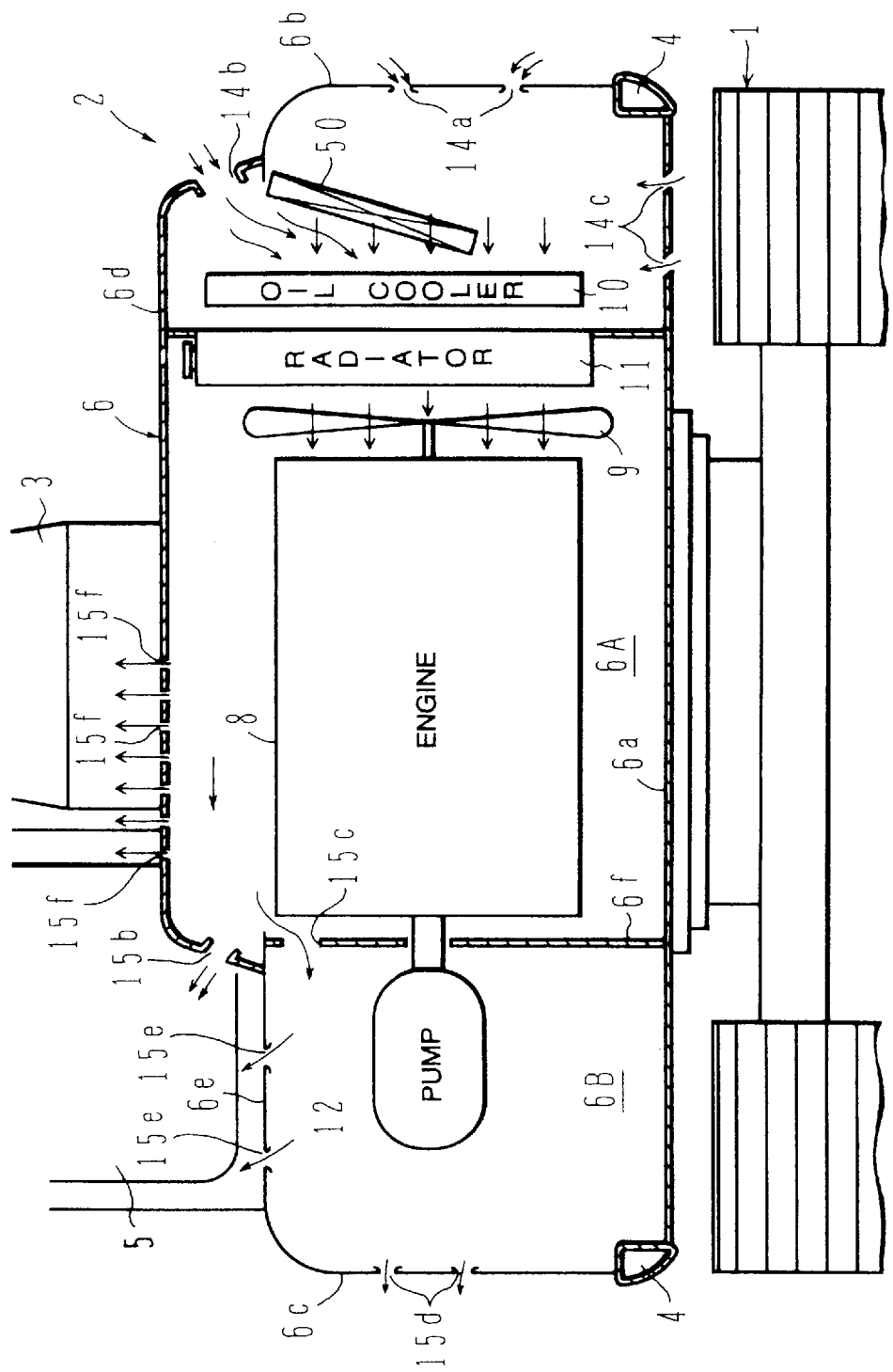
FIG. 1 is a vertical sectional view of a machine room of a hydraulic excavator with a cooling structure according to a first embodiment of the present invention.
Figure 2:
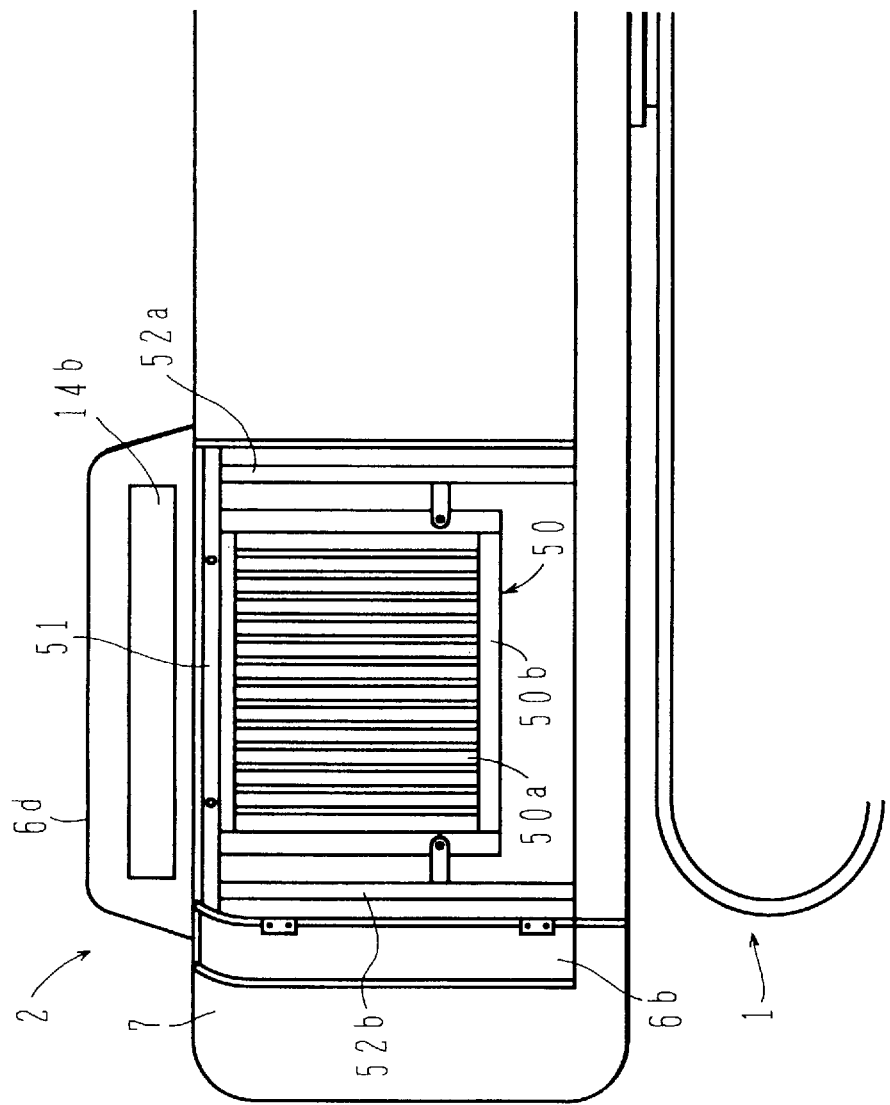
FIG. 2 is a side view showing the interior structure when a door on the engine room side of the machine room of the hydraulic excavator shown in FIG. 1 is open.
Figure 3:
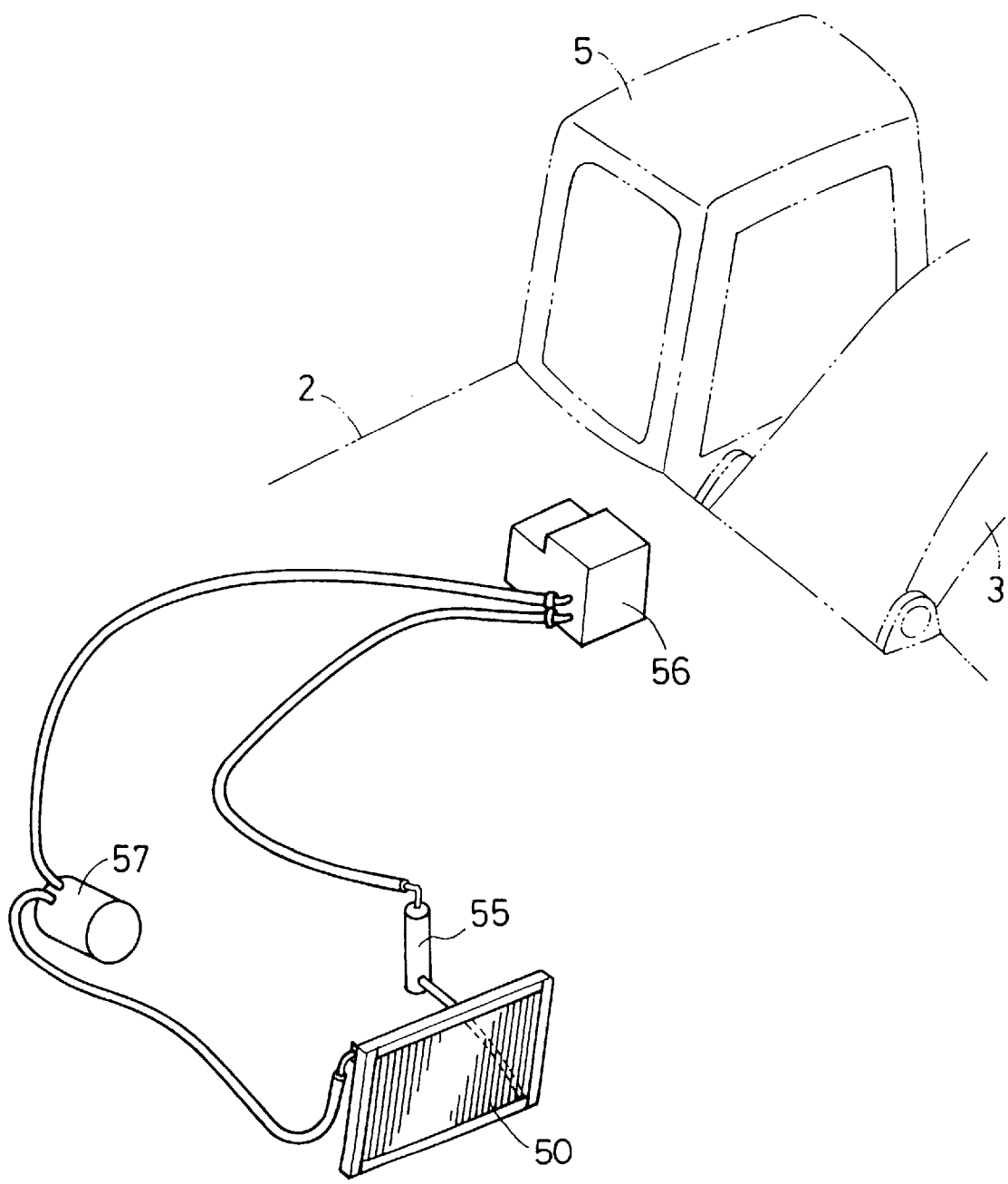
FIG. 3 is a view showing an air conditioning system including a condenser.

A first embodiment of the present invention will be described with reference to FIGS. 1 to 3. In FIG. 1, reference numeral 1 denotes an undercarriage of a hydraulic excavator. An upper structure 2 is swingably mounted on the undercarriage 1, and a front attachment 3 is vertically rotatably attached to a front portion of the upper structure 2. The upper structure 2 mainly comprises a swing frame 4 serving as a skeleton structure, a cab 5 installed in a front portion of the swing frame 4, a machine room 6 installed in a rear portion of the swing frame 4, and a counter weight 7 installed at the rearmost end of the swing frame 4.

The machine room 6 is constructed by a bottom panel 6a, left and right side panels 6b, 6c, an engine cover 6d, and a top panel 6e which are arranged so as to form a box-shaped structure. The interior of the machine room 6 is divided by a partition panel 6f into an engine room 6A and a pump room 6B. An engine 8, a cooling fan 9 attached to the engine 8, a condenser 50, an oil cooler 10, a radiator 11, a muffler (not shown) for discharging exhaust gas after combustion in the engine 8, and so on are installed in the engine room 6A. A hydraulic pump 12 driven by the engine 8 to rotate a motor for a hydraulic system, an air cleaner (not shown) for filtering air sucked into the engine 8, and so on are installed in the pump room 6B.

Intake ports 14a, 14b are formed respectively in the side panel 6b defining the engine room 6A of the machine room 6 and a side wall of the engine cover 6d. Also, intake ports 14c are formed in the bottom panel 6a. Exhaust ports 15f, 15b are formed in the engine cover 6d, and openings 15c are formed in the partition panel 6f. Exhaust ports 15d, 15e are formed respectively in the side panel 6c defining the pump room 6B and the top panel 6e. Open air sucked by the fan 9 through the intake ports 14a, 14b, 14c cools the condenser 50, the oil cooler 10 and the radiator 11 successively, following which it is discharged to the outside through the exhaust ports 15f, 15b, 15d, 15e.

Further, as a structural feature in the cooling structure of this embodiment, the oil cooler 10 is erected parallel to the radiator 11, while the condenser 50 is inclined so as to extend from a portion near a lower end of the uppermost intake port 14b formed in the side wall of the engine cover to a position near a lower end of the sidefacing surface of the oil cooler 10.

The side panel 6b is constructed as a door. FIG. 2 shows the interior structure when the door is made open. The condenser 50 is made up of a number of vertical tubes 50a through which a coolant flows, the tubes 50a being supported by a frame 50b together. The frame 50b is fixed by bolts or the like to a horizontal frame 51 and vertical frames 52a, 52b which are in turn fixed at a proper location within the engine room 6A.

The condenser 50 is a component of an air conditioning system. The air conditioning system comprises, as shown in FIG. 3, the condenser 50, a liquid tank 55, an expansion valve and an evaporator (both not shown) installed in an air conditioner unit 56, and a compressor 57 which are interconnected by tubes in this order. The air conditioner unit 56 is installed in the cab 5 and air is supplied to the evaporator by a not-shown fan so that cooled air is blown into the cab 5.

This embodiment thus arranged operates as follows. As explained above, the open air sucked by the fan 9 through the intake ports 14a, 14b, 14c cools the condenser 50, the oil cooler 10 and the radiator 11 successively, following which it is discharged to the outside through the exhaust ports 15f, 15b, 15d, 15e. At this time, in this embodiment, since the condenser 50 is disposed in an inclined posture as mentioned above, the condenser 50 serves as a guide plate for the open air sucked through the uppermost intake port 14b, allowing the open air sucked through the intake port 14b to flow downward along the condenser 50.

On the other hand, the open air sucked through the intake ports 14b flows in part directly into the oil cooler 10 and the radiator 11, while the other part flows into the condenser 50. A stream of the air flowing into the condenser 50 is straightened by the baffling action of the tubes 50a (see FIG. 2) of the condenser 50, and then merges with the open air sucked through the intake port 14b. Thus, the open air sucked through the uppermost intake port 14b and the open air sucked through the lower intake ports 14a, 14c will not directly interfere with each other.

Specifically, the open air sucked through the intake port 14b flows downward smoothly along the condenser 50 and then flows into the oil cooler 10 and the radiator 11 while cooling the condenser 50. Also, part of the open air sucked through the intake ports 14a passes through the condenser 50 while cooling it, and then merges with the open air sucked through the intake port 14b before entering the oil cooler 10 and the radiator 11. It is therefore possible to not only cool the condenser 50, but also smooth the air stream supplied to the oil cooler 10 and the radiator 11. As a result, the flow resistance on the entry side of the fan 9 is reduced, the intake efficiency is increased, and the cooling ability for the radiator 11 and the oil copler 10 is enhanced.

Figure 4:
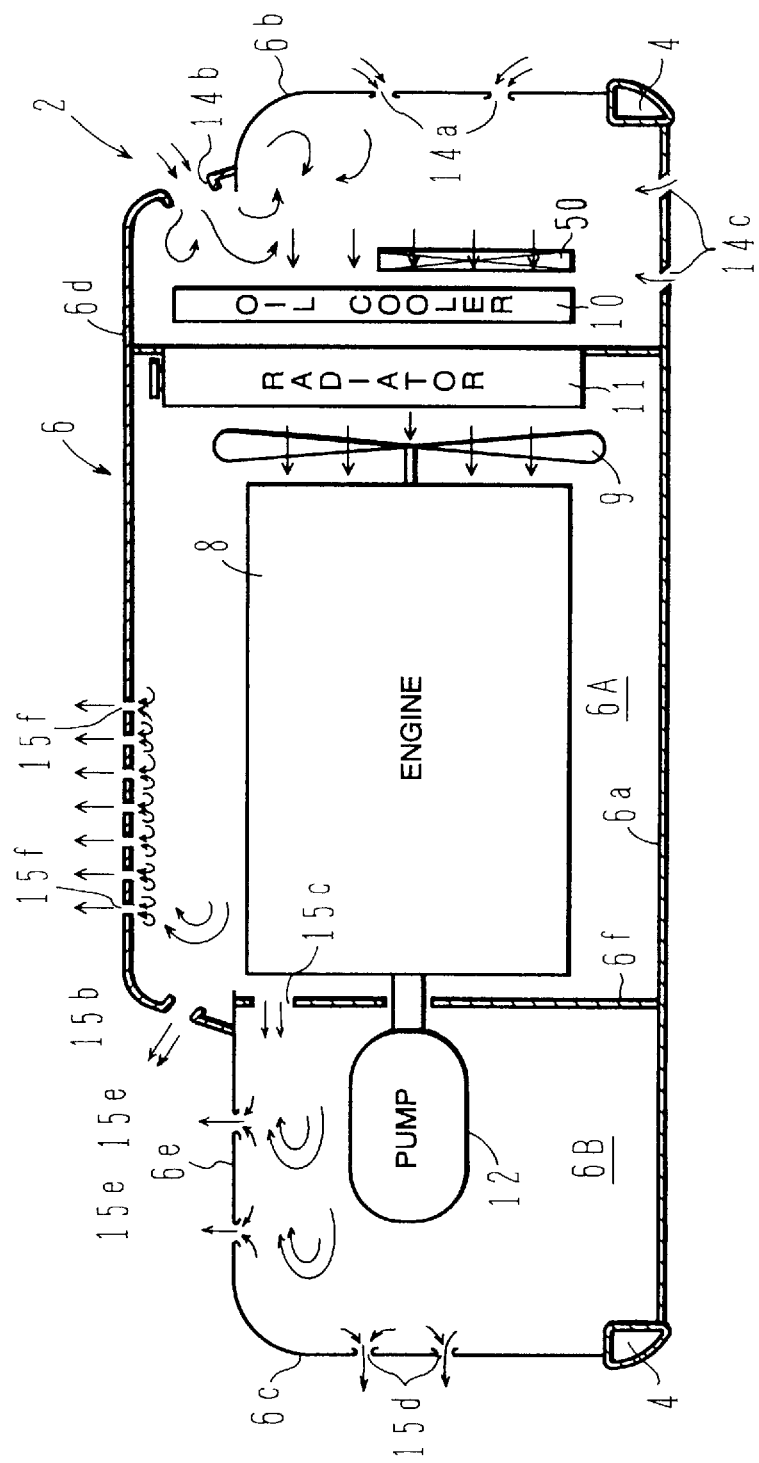
FIG. 4 is a vertical sectional view of a machine room of a hydraulic excavator with a conventional cooling structure.

For comparison, a conventional cooling structure is shown in FIG. 4. It has been usual that the radiator 11 and the oil cooler 10 are arranged vertically parallel to each other and, in addition, the condenser 50 is also arranged vertically parallel to those components. In such a conventional cooling structure, the open air sucked through the uppermost intake port 14b collides with the open air sucked through the intake ports 14a, whereby the air stream is disturbed as shown. Further, because the condenser 50 is installed parallel to the oil cooler 10, the condenser serves merely as a resisting member against the open air sucked through the intake ports 14a, resulting in that the flow resistance on the entry side of the fan 9 is increased and the intake efficiency is reduced.

Results of experiments made to confirm advantages of this embodiment are as follows. A wheel type hydraulic excavator of 15 ton class was run over a mountain path, and saturated temperatures of the engine cooling water and the hydraulic fluid were measured. As a result, the temperatures of the engine cooling water and the hydraulic fluid were both 62° C. in terms of difference relative to the open air temperature for the excavator having the cooling structure with no condenser (with the condenser 50 shown in FIG. 4 omitted) and 64° C. for the excavator having the conventional cooling structure shown in FIG. 4, whereas both the temperatures were 60.5° C. in terms of difference relative to the open air temperature for the excavator having the cooling structure of this embodiment shown in FIG. 1.

From the above results, it was confirmed that while the cooling ability was lowered 2° C. in the conventional cooling structure shown in FIG. 4 as compared with the cooling structure including no condenser, it was improved 1.5° C. in the cooling structure of this embodiment, i.e., that the cooling ability was improved 3.5° C. in the cooling structure of this embodiment as compared with the conventional cooling structure shown in FIG. 4.

According to this embodiment, as described above, it is possible to cool the condenser 50 and achieve a higher cooling ability than conventional with a simple structure of attaching the condenser 50 in an inclined posture.

A second embodiment of the present invention will be described with reference to FIGS. 5 and 6. In these figures, identical members to those shown in FIG. 1 are denoted by the same reference numerals. This embodiment is intended to improve the exhaust efficiency as well as the intake efficiency, thereby further enhancing the cooling ability.

Figure 5:
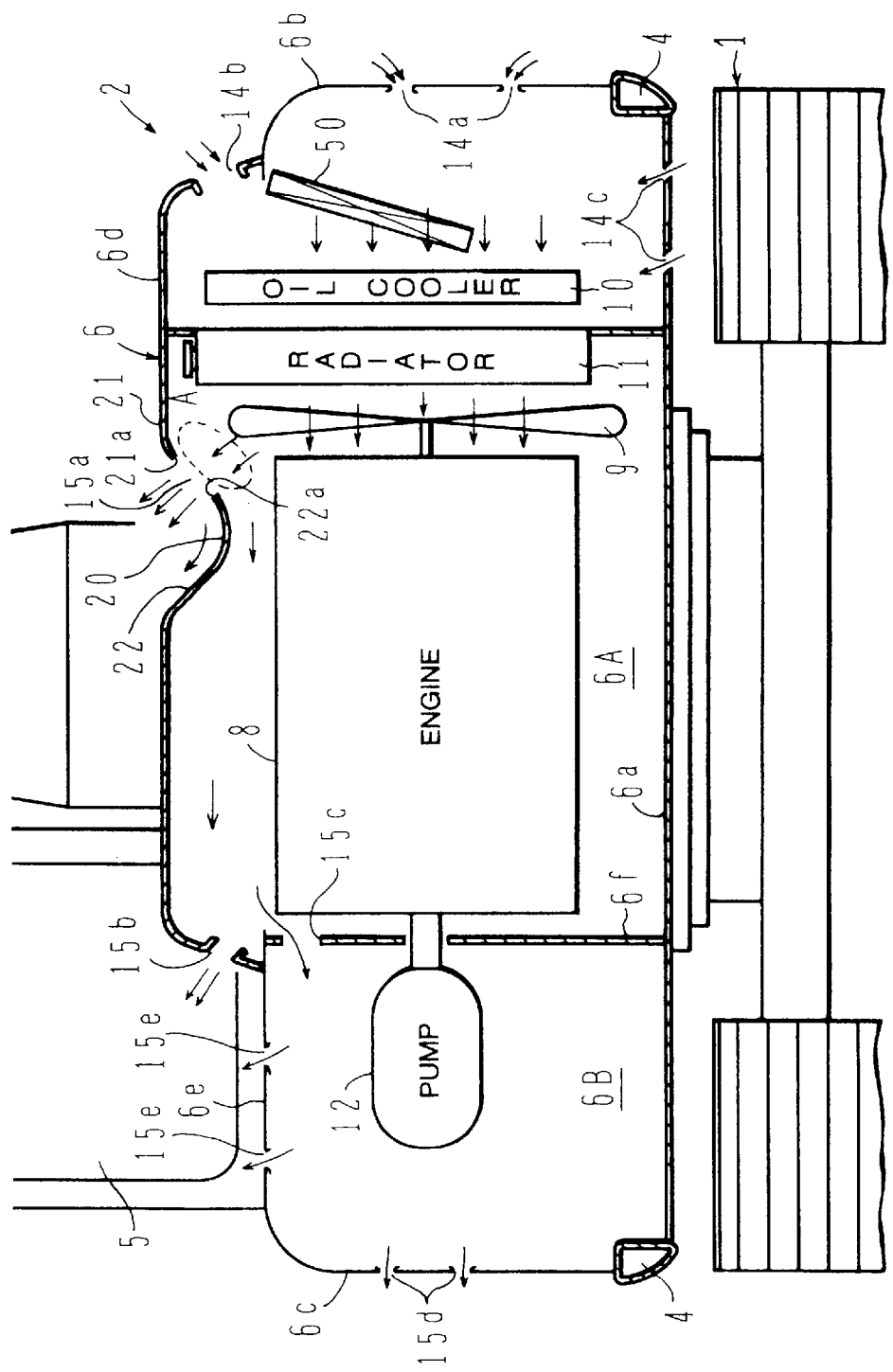
FIG. 5 is a vertical sectional view of a machine room of a hydraulic excavator with a cooling structure according to a second embodiment of the present invention.

Referring to FIG. 5, in the cooling structure of this embodiment, a recess 20 is formed in a portion of the engine cover 6d above a front portion of the engine 8, and exhaust ports 15a are formed in a slope of the recess 20 on the same side as the fan 9. By so forming the exhaust ports 15a, a space A having a proper size is defined among a portion 21 of the engine cover 6d, which is positioned radially outside the fan 9, the exhaust ports 15a and the fan 9. The portion 21 of the engine cover 6d which is positioned radially outside the fan 9 functions as a first guide for guiding the cooling air just after having passed the fan 9, as a laminar flow, to the exhaust ports 15a, and an opposite slope 22 of the recess 20 which is inclined downward toward the fan 9 functions as a second guide for guiding the cooling air discharged through the exhaust ports 15a as a laminar flow. A distal end 22a of the second guide 22 is positioned lower than the first guide 21, and the exhaust ports 15a are each positioned between the distal end 22a of the second guide 22 and a distal end 21a of the first guide 21 in opposite relation to the space A across the cooling air supplied from the fan 9 as a laminar flow. Additionally, a passage area between an upper surface of the engine 8 and a lower end of the second guide 22 is narrowed by the presence of the recess 20.

With the exhaust ports 15a and the first and second guides 21, 22 arranged as explained above, most of the cooling air having passed the fan 9 is discharged as a laminar flow through the exhaust ports 15a near the fan 9. Because the distance from the fan 9 to the exhaust ports 15a is short and the cooling air is discharged as a laminar flow, the flow resistance is very small. Therefore, even if the area of the exhaust ports 15a is set to be small, the exhaust efficiency is kept high and a sufficient cooling ability is obtained. On the other hand, part of the cooling air from the fan flows toward the rear side of the engine through the passage between the upper surface of the engine 8 and the lower end of the second guide 22 (the recess 20). At this time, since a flow rate of the cooling air is limited appropriately by the throttling action of the recess 20, the air stream becomes moderate and is discharged through the exhaust ports 15b, 15d, 15e without causing a turbulent flow of air. As a result, the occurrence of turbulent flow sounds is suppressed and surroundings noise is reduced.

Figure 6:
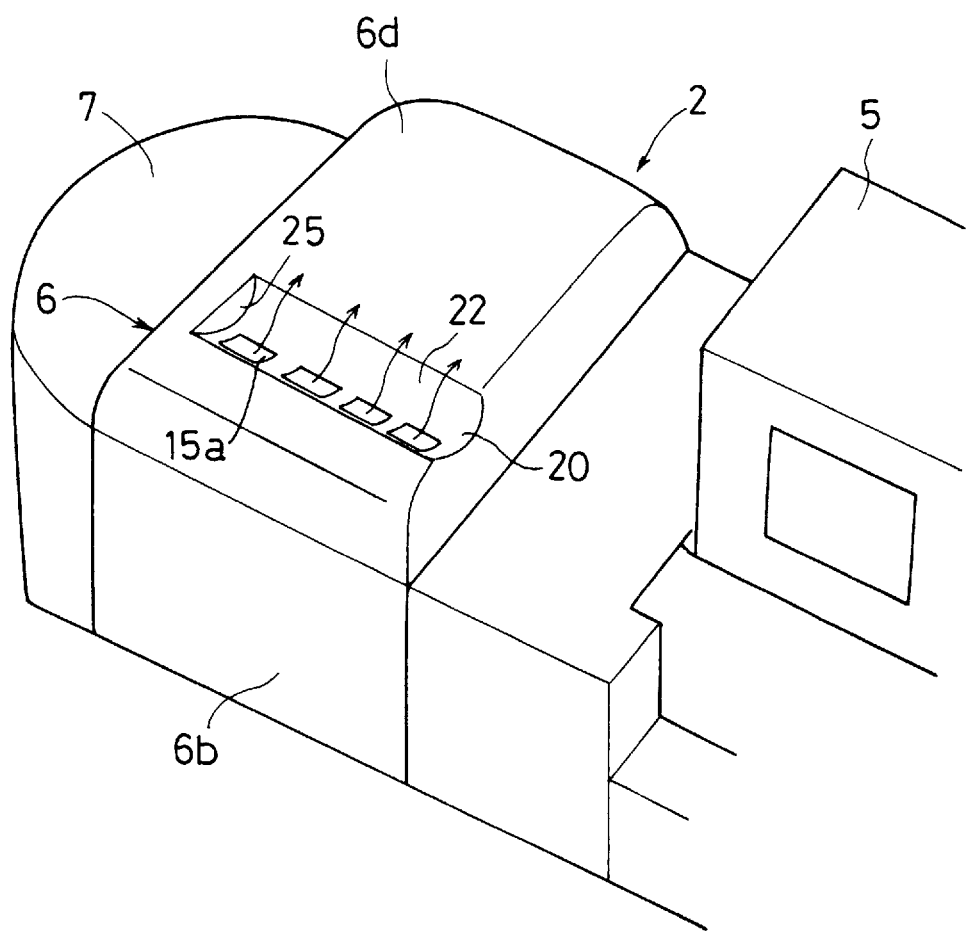
FIG. 6 is a perspective view of a section including the machine room of the hydraulic excavator shown in FIG. 5, the view looking from above obliquely.

Further, as shown in FIG. 6, the recess 20 formed in the engine cover 6d is made open at one end in a side wall of the engine cover 6d facing the cab 5, but is terminated halfway on the side near the counterweight 7, leaving a sound shielding partition 25 between the recess 20 in the engine cover 6d and the counterweight 7. This arrangement prevents noise leaked through the exhaust ports 15a from spreading toward the counterweight 7 (rearwardly of the machine body), and hence contributes to further reducing the surroundings noise.

As with the first embodiment, since the condenser 50 is arranged in an inclined posture on the entry side of the fan 9, it is possible to not only cool the condenser 50, but also smooth the air stream supplied to the oil cooler 10 and the radiator 11. As a result, the flow resistance on the entry side of the fan 9 is reduced and the intake efficiency is increased.

According to this embodiment, therefore, the flow resistance is reduced on both the entry and delivery sides of the fan 9, both the intake efficiency and the exhaust efficiency are increased, and the cooling efficiency for the radiator 11 and the oil cooler 10 can be further improved.

Further, according to this embodiment, most of the cooling air having passed the fan 9 is discharged as a laminar flow through the exhaust ports 15a near the fan 9, the occurrence of turbulent flows at the exhaust ports 15b, 15d, 15e on the rear side is also suppressed, and noise leaked through the exhaust ports 15a is from spreading rearwardly of the machine body by the presence of the sound shielding partition 25. This results in the advantages that the occurrence of turbulent flow sounds and the spreading of noise are suppressed and the surroundings noise is reduced.

According to the present invention, with a simple structure of attaching the condenser in an inclined posture, it is possible to cool the condenser and achieve a higher cooling ability than conventional.

Also, the flow resistance is reduced on both the entry and delivery sides of the fan, both the intake efficiency and the exhaust efficiency are increased, and the cooling efficiency for the radiator and the oil cooler can be further improved.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a construction machine having a frame; an engine mounted on said frame within an engine compartment and including a rotatable fan; an oil cooler supported on said frame within said engine compartment; a radiator supported on said frame within said engine compartment; and an air conditioning condenser supported on said frame within said engine compartment, said engine compartment including a first intake port formed in an upper side part of said engine compartment, a second intake port formed in a side part of said engine compartment at a position lower than said first intake port, ambient air being sucked by said fan when rotated by said engine through said first and second intake ports to flow through and cool said condenser, said oil cooler and said radiator, said ambient air after being used for the cooling being discharged through an engine cover at the top of said engine compartment, the improvement comprising:

said condenser is inclined so as to extend from a portion near a lower end of said first intake port formed in the side part of the engine compartment to a position near a lower end of said oil cooler whereby the condenser serves as a guide plate for the ambient air sucked though the first inlet port.

2. The construction machine according to claim 1, wherein the engine cover includes exhaust ports formed above a front portion of said engine, a first guide positioned radially outside said fan for guiding the ambient air just after having passed said fan, to said exhaust ports, and a second guide positioned above the front portion of said engine for guiding the ambient air discharged through said exhaust ports, said second guide having a distal end positioned lower than said first guide, said exhaust ports being each positioned between the distal end of said second guide and a distal end of said first guide across which the ambient air flows.

* * * * *